United States Patent [19]

Keller

[11] 4,319,484
[45] Mar. 16, 1982

[54] LINEAR RESPONSE CAPACITANCE WAVE HEIGHT MEASURING SYSTEM

[75] Inventor: Christian A. Keller, Baltimore, Md.

[73] Assignee: The Johns-Hopkins University, Baltimore, Md.

[21] Appl. No.: 71,704

[22] Filed: Aug. 31, 1979

[51] Int. Cl.$^3$ .............................................. G01F 23/26
[52] U.S. Cl. .................................................. 73/304 C
[58] Field of Search ...................................... 73/304 C

[56] References Cited

U.S. PATENT DOCUMENTS

| | | | |
|---|---|---|---|
| 2,789,435 | 4/1957 | Weiss | 73/304 C |
| 2,866,336 | 12/1958 | Hitchcox | 73/304 C |
| 3,360,951 | 1/1968 | Hoenisch | 73/304 C X |
| 3,706,980 | 12/1972 | Maltby | 73/304 C X |
| 3,768,006 | 10/1973 | Mueller | 73/304 C X |
| 4,010,650 | 3/1977 | Piatkowski, Jr. | 73/304 C |

*Primary Examiner*—Gerald Goldberg
*Assistant Examiner*—Joseph W. Roskos
*Attorney, Agent, or Firm*—Robert E. Archibald; Marc A. Block

[57] ABSTRACT

A generated signal is passed through an elongated signal conveying element positioned preferably perpendicular to the surface of a fluid the level of which is to be measured. The signal is directed from the signal conveying element to a detector element which senses the signal output from the signal conveying element. The signal output detected varies linearly with the depth of immersion of the signal conveying element into the fluid. In one embodiment, the signal conveying element is a capacitive probe comprising two plates or wires, one of which is grounded to the fluid into which the two plates or wires are immersed. Proper selection of accompanying circuitry results in detected signal changes which vary linearly with immersion changes. A second embodiment employs an electromagnetic wave, e.g. light, signal which passes through a light pipe signal conveying element. By nearly matching the light pipe index of refraction with that of the fluid, a predetermined percentage of the wave is lost into the fluid. The portion of light sensed at a detector, which is located where the unrefracted light exits, is simply converted to a linear output which corresponds to the depth the light pipe signal conveying element is immersed into the fluid.

14 Claims, 7 Drawing Figures

OUTPUT OF PULSE
GENERATOR TIMER 104

OUTPUT ACROSS
TRANSDUCER PROBE 100

LINEAR RESPONSE CAPACITANCE WAVE HEIGHT MEASURING SYSTEM

STATEMENT OF GOVERNMENTAL INTEREST

The invention described herein was made in the course of or under a contract or subcontract thereunder with the Department of the Navy.

TECHNOLOGICAL CONTEXT OF THE INVENTION

The general concept of placing two vertical plates in a liquid and measuring the changing capacitance therebetween as the level of immersion of both plates changes has been disclosed in the prior art. One reference, U.S. Pat. No. 4,010,650, discloses the submersion of two enclosed, vertically-oriented electrode probes in a liquid reservoir. Maintaining one probe at a fixed distance from the other, 180° out-of-phase square wave signals are applied to the two probes, respectively. The frequency of the square waves is determined by RC circuitry. Although this reference mentions the possibility of direct electrical contact between the two probes and the water, it does not disclose the use of one fluid-grounded probe in its circuitry. The reference discusses "direct electrical contact of metal probes as unsatisfactory" and does not even suggest using such a probe as a ground. Other apparatuses (such as that taught in U.S. Pat. No. 2,789,435) also recognize the desirability of a linear system response, i.e., the voltage output being nearly proportional to the liquid level. This reference considers linearity problems resulting from temperature changes, dielectric density variations, and changes in liquid characteristics and provides a compensating capacitor intended to linearize the response under various environments. Only limited linearity, where the amount of nonlinearity is presupposed, is achieved. Other references (like U.S. Pat. Nos. 4,051,431 and 3,933,042) include transformer coupled capacitors in liquid type measuring apparatuses. U.S. Pat. No. 3,161,054 provides a capacity type measuring system wherein a square wave is applied to one of two capacitive plates, the second plate being connected to ground through a diode element. During each positive half cycle of the square wave, the immersed capacitor charges rapidly through a diode rectifier. During the negative half cycle, the capacitor discharges through a resistor and a meter at a rate which is related to the level of the fuel within the tank. The current flowing through the meter during positive half cycles is in a direction opposite to that of the current flowing during the negative half cycles. The net current read by the meter is related to the level of the liquid. According to U.S. Pat. No. 3,161,054 the average net current through the meter "is accurately proportional to the capacity of the capacitor if the voltage and the frequency of the square wave are held constant." Frequency regulating elements are thus provided.

Such technology, while underscoring the significance of a linear capacitive fluid level measuring apparatus, fails to disclose linearity of response over a large dynamic range, insensitivity to salinity, and minimal signal degradation.

SUMMARY OF THE INVENTION

In order to improve on prior technology, it is an object of the invention to provide a liquid level measuring device capable of measuring ocean waves or other varying fluid levels ranging in frequency to indicate low frequency or short period waves (0.5 Hz to 20 Hz) by providing a flat frequency response from dc to at least 20 Hz, depending on the sensor used.

It is also an object of the invention to provide an essentially linear output response of liquid level or wave amplitude versus generated voltage over a large dynamic range, the voltage being computer-compatible or digitizable to facilitate liquid level or wave data analysis. In accordance with a capacitive probe embodiment of the invention, proper component values are selected to provide such linearity. In an optical embodiment, voltage output which varies logarithmically with fluid level changes is passed through a conventional logarithmic amplifier to produce broad range linearity.

It is yet another object to provide a system consisting of an array of transducers which may operate from a common structure, i.e., a single oscillator driving all transducers, to supply fluid level data of a large area, and to determine fluid wave characteristics and motion. The oscillator, or modulator, together with the array, can be used for nonlinear waves of wavelengths ranging from less than one millimeter to hundreds of meters, of wave heights to tens of meters, and of wave periods from milliseconds to tens of seconds. Data resulting from the array of transducers provides a time series analysis of sea elevation and such characteristics as mean, variance, amplitude probability density, autocorrelation, and power spectral density.

It is still another object to provide a wave-measuring device which avoids signal degradation due to crosstalk interference between transducers in an array, is insensitive to salinity, and may be used in fresh water, salt water or brackish water without requiring re-calibration. U.S. Pat. No. 3,141,094 discusses the requirement of calibration for different geometries and fluids in which measurements are made. The invention minimizes this dependence.

The invention also has as an object to achieve stable and long-term, low-power operation thus limiting long-term drift with changes in environmental conditions.

A still further object is to minimize phase shift in a capacitive probe fluid level detector, thereby minimizing the time lag between transducer changes and output voltage variations.

It is yet still another object to enclose one plate or element of a capacitive probe in dielectric insulation and to ground the other plate or element in a fluid the level of which is to be measured. By immersing the insulated plate or element in a varying level of fluid and placing it in close proximity to the grounded plate or element, a given a.c. signal generated across the two plates or elements and properly selected circuit components will vary linearly with fluid level. Grounding one plate of the transducer to a common circuit ground (i.e. the fluid ground) permits the use of a single oscillator operating from a common power supply to excite a number of transducers without cross-talk between the transducers.

As an instrument for sensitively measuring wave heights, the present invention provides a simple, inexpensive, and rugged instrument useful on buoys, piers or other platforms afloat at sea. The measurement of tides, storms, wind-driven waves, navigational hazards, erosion of bulkheads, oil spilling and oil recovery, earthquake-induced waves, structural fatigue, sediment erosion, and erosion effects on harbors and docks is readily accomplished by the present invention. Further, as suggested by the prior art, the use of the present invention as a liquid level measuring device, especially for measuring fuel levels in vehicles such as aircraft, may be of significance to various industries.

The capacitive embodiment can examine an area of 40/1000 square inches. Use of the invention in high resolution applications, as well as use over a relatively wide area with a plurality or array of capacitive probes, suggests the broad utility of the invention.

The availability of software designed for analyzing data in a linear response system also enhances the versatility and value of the present invention.

Finally, the use of anodized Tantalum as a transducer probe in the capacitive embodiment results in various advantages, including greater sensitivity (due to anodized Tantalum's much higher dielectric constant), less corrosion, and greater strength and durability.

DESCRIPTION OF THE INVENTION

Figure 1:
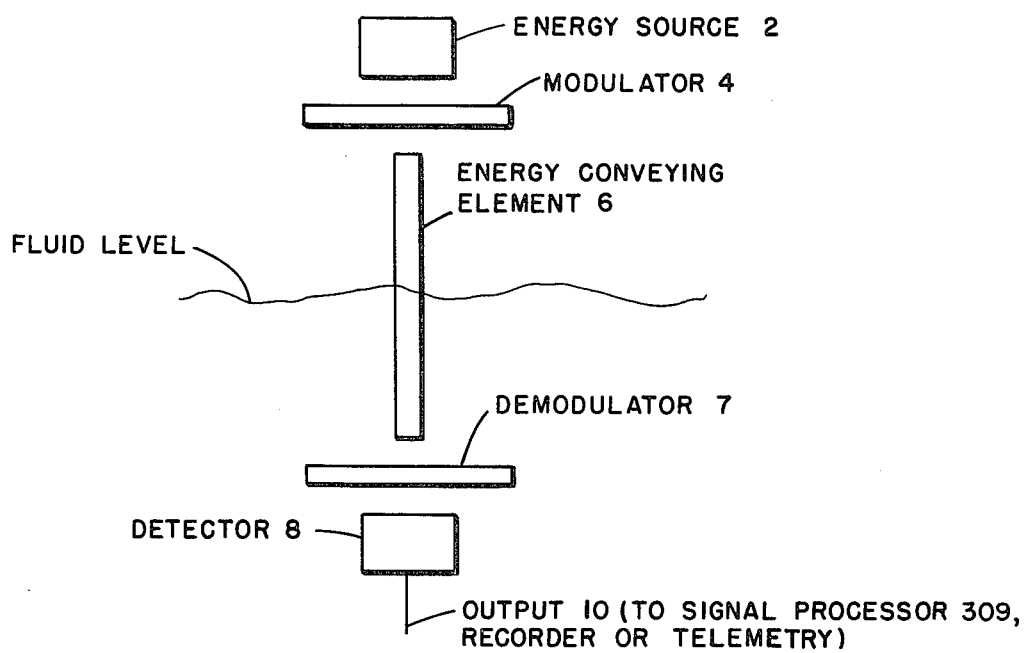
FIG. 1 is a general block diagram of the invention.

Referring to FIG. 1, an energy source 2 is shown feeding a signal to a modulator 4 before the signal enters an energy conveying element 6. A detector 8 senses the magnitude of energy from the conveying element 6 and demodulates the signal in demodulator 7 to recover only desired energy. The detector 8 can provide an output 10 which varies either linearly or logarithmically with variations in a fluid level 12. A logarithmic output can be conventionally amplified to provide a linear output.

The fundamental operation of the apparatus of FIG. 1 is to transmit energy of a particular waveform or wavelength through a conveying element 6 the signal output of which can be rendered linear over a wide dynamic range.

Figure 2:
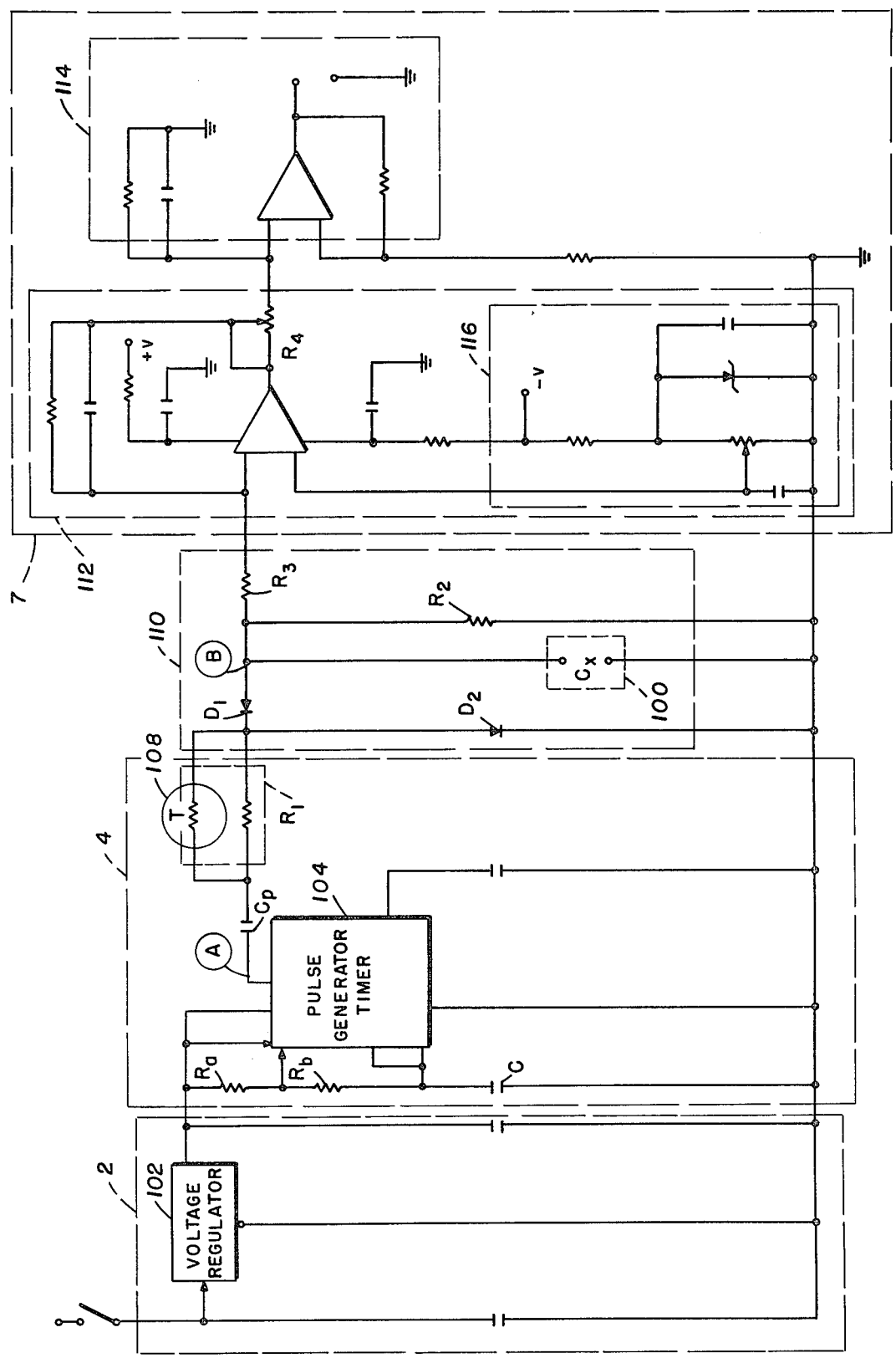
FIG. 2 is a diagram showing the capacitive embodiment of the present invention with associated circuitry.

FIG. 2 shows a capacitance transducer probe 100 and associated apparatus used in measuring the level of a fluid, such as the height of an ocean wave at a particular point. Unlike other fluid level detectors, the capacitive embodiment is durable and sensitive enough to extend as deep as three meters into a fluid to measure variations in level.

Figure 3:
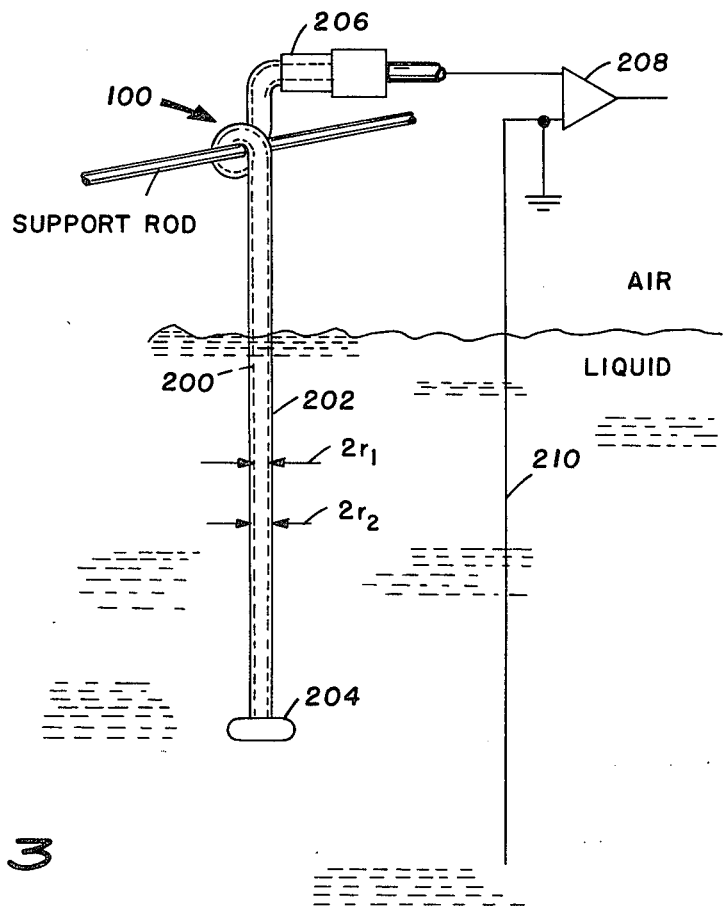
FIG. 3 illustrates a capacitive probe with a fluid grounded element in accordance with the invention.

The transducer probe 100 is shown in FIG. 3 in its environment. A stainless steel conductor or Tantalum core 200 with a radius $r_1$ is surrounded by insulation 202 (of polyvinyl chloride, teflon, polyethylene, polypropylene, or anodization on the Tantalum) having an outer radius $r_2$. The insulator 202 provides the dielectric of a capacitor having the conductor 200 and the liquid grounded wire 210 as its two "plates." Variations in depth of immersion cause directly proportional changes in capacitance where the effective area of the plates varies proportionally with depth of immersion.

The capacitance of the transducer probe 100 may be defined $$as\ C_x = \frac{.2416\ K}{\log_{10}(r_2/r_1)}$$

where
$K$ = dielectric constant (of insulation)
$r_2$ = outside radius
$r_1$ = inside radius.

Anodized Tantalum with $K=25$ is significantly preferable over teflon ($K=2.1$), polypropylene ($K=2.2$), polyethylene ($K=2.25$), and polyvinyl chloride ($K=3.2$) even though, as later described, lower values of $C_x$ are desired. Tantalum provides 500–1000 pF/cm sensitivity along the length of a transducer probe 100 as compared to 1–3 pF/cm for prior insulation materials suggesting greater sensitivity. Anodized Tantalum also features superior resistance to corrosion and high tensile strength. The transducer probe 100 includes a fluid-tight seal 204 and 206 at each end of the length of insulation-enclosed conductor 200. At the seal 206, the conductor 200 is connected to an amplifier 208. The other input to the amplifier 208 is a fluid-grounded element 210. The grounded wire or plate 210 extends parallel to and beyond the length of the conductor 200. The conductor 200 and the grounded wire or plate 210 comprise the two plates of the transducer probe 100 employed in the present invention. The transducer probe 100 is, preferably, oriented perpendicular to the mean surface of the fluid. (Although the transducer probe 100 may enter the fluid at a slant angle, the simplest embodiment suggests perpendicular positioning.) As seen in FIG. 3, a portion of the conductor 200 is immersed in the fluid the level or height of which is to be measured (hereinafter referred to as but not limited to "liquid"). The remaining portion of the conductor 200 is encompassed by another fluid, hereafter referred to as but not limited to "air", which has a significantly greater dielectric constant. The portion of the conductor 200 immersed in the liquid serves to define the effective length or capacitive area of the transducer probe 100. As the liquid level varies, as in wave motion between d.c. and 20 Hz, variations in the effective area of the exposed capacitance varies. Although intuitively the variation in capacitance in response to liquid level variations appears non-linear, by judicious selection of components in FIG. 2, the response over the broad dynamic range is linear.

Referring again to FIG. 2, the transducer probe 100 (of FIG. 3) is shown with accompanying circuitry. A 40 kHz signal is passed through a conventional voltage regulator 102, the output from which enters a conventional pulse generator timer 104 (such as a Teledyne NE355 or Teledyne NE555 timer). The pulse generator timer 104 serves to switch the constant 40 kHz signal (of approximately 10 volts) from the voltage regulator 102 on and off, thereby determining a duty cycle for a square-wave output signal. The duty cycle of the square wave is determined by the values of resistors $R_a$, $R_b$, and C. A temperature compensation element $R_1$ maintains the signal voltage at a constant amplitude (e.g. 10 volts) over a range of temperatures. Preferably, the temperature compensation element $R_1$ includes a simple thermistor 108. The voltage regulated signal is a.c. coupled with low impedance to capacitive probe and detector circuitry 110 via a capacitor $C_p$ and the temperature compensation element $R_1$. The circuitry 110 includes two diodes $D_1$ and $D_2$, two resistors $R_2$ and $R_3$, and the transducer probe 100. The temperature compensation element $R_1$ compensates for temperature variations which affect the impedances of the diodes $D_1$ and $D_2$.

Figure 4A:
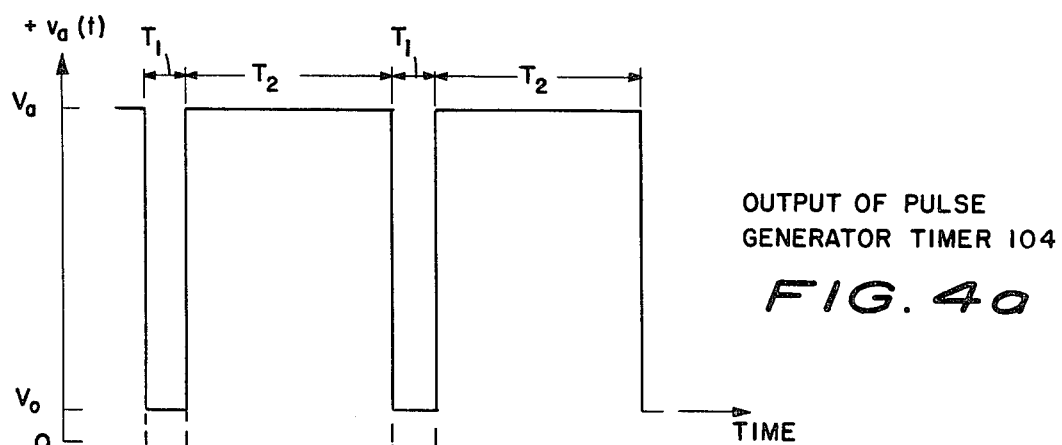
FIGS. 4a and 4b are curves which show linear signal response of the capacitive embodiment of FIG. 2.

In operation, the output (at point A) of the pulse generator timer 104, referred to as $v_a$, is shown in FIG. 4a. During the negative phase $T_1$ of the square wave, $D_1$ permits current to flow to charge the transducer probe 100. $D_2$, at this time, blocks the flow of current to ground. During the positive phase $T_2$ of the square wave cycle, the transducer probe 100 discharges through resistor $R_2$. The voltage across $R_2$ is proportional to the value of capacitance $C_x$ associated with the transducer probe 100 at a given time. Also during the positive phase $T_2$, diode $D_2$ charges capacitance $C_p$ in preparation for the next charging cycle of the transducer probe 100.

Figure 4B:
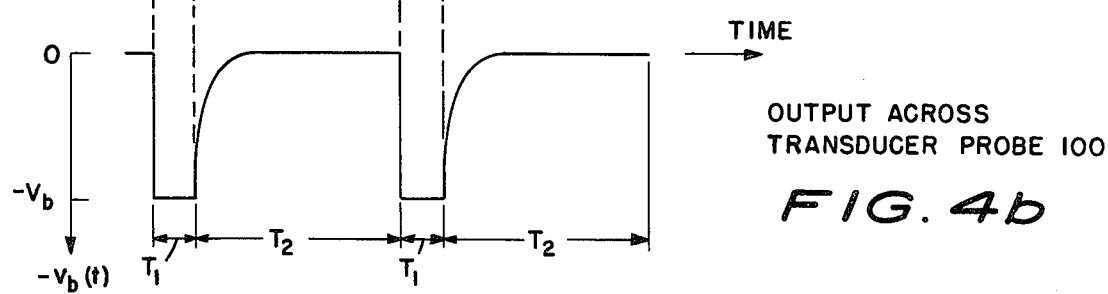

These various circuit components are selected to provide the following characteristics. The reactance of $C_p$ at the 40 kHz excitation frequency is less than 0.85 Ω and thus negligible. The maximum voltage imposed across $C_p$ is (in the discussed embodiment) 10 volts and the voltage drop across either diode $D_1$ or $D_2$ when it is conducting is 0.6 volt at 25° C., yielding a peak diode current of 3.6 mA. Values of $R_1$ and $R_2$ are selected so that $R_1C_x << R_2C_x$, $R_2C_x << T_2$, and $R_1C_x << T_1$, and $T_1 << T_2$ (see FIG. 4a). Under these conditions the input wave form diagrammed in FIG. 4a results in the output wave form in FIG. 4b. The average output voltage across resistor $R_2$ (and hence transducer probe 100) is:

$$<v_b> = \frac{1}{T_1 + T_2}\left( V_b T_1 + \int_0^{T_2} V_b \exp(-t/R_2C_x)dt \right)$$

$$= \frac{V_b}{T_1 + T_2}\{T_1 - R_2 C_x [\exp(-T_2/R_2C_x) - 1]\}$$

$$= \left(\frac{V_b R_2}{T_1 + T_2}\right)[1 - \exp(-T_2/R_2 C_x)] C_x + \frac{V_b T_1}{T_1 + T_2}$$

where $V_b$ is the maximum voltage across resistor $R_2$. If $\exp(-T_2/R_2C_x) << 1$, we have $$<v_b> = \left(\frac{V_b R_2}{T_1 + T_2}\right) C_x + \frac{V_b T_1}{T_1 + T_2}$$

This final equation is a linear relation between $v_b$ and $C_x$. It is, of course, well known that capacitance $C = \epsilon A/d$ where "d" is the spacing between the plates of a capacitor, "A" is the capacitive area of the plates, and "$\epsilon$" is the dielectric constant of the material between the plates. With d and $\epsilon$ constant, capacitance varies in proportion to changes in area or, in accordance with the invention, the level of capacitance immersion. Establishing that $v_b$ is linear with $C_x$ thus indicates that $v_b$ also varies linearly with fluid level.

The above equation for $v_b$ also shows that sensitivity varies with $V_b$ and $R_2$. By way of example, assume a non-linearity of less than 1 percent is sought with $R_2 = 2100$ Ω and $T_2 = 17$ μsec. The condition that $\exp(-T_2/R_2C_x) < 0.01$ indicates that $$C_x < \frac{T_2}{R_2 \, 4.605} = \frac{17 \times 10^{-6}}{2.1 \times 10^3 \times 4.605} = 1760 \, pF.$$

With teflon, polyvinyl chloride, polyethylene, or polypropylene, such capacitance is readily achievable.

With anodized Tantalum, however, it should be noted that various changes in frequency, in $C_p$, and $R_2$ values would be required to maintain linearity due to the previously mentioned higher dielectric constant K for Tantalum.

Two stages of first-order, low-pass filters 112 and 114 follow the detection circuit and extract the average valve of $v_b(t)$. In the first stage 112 a voltage from a Zener regulated supply 116 is summed with the transducer signal to establish a zero offset (see FIGS. 4a and 4b). To prevent coupling between offset and gain, a gain control resistor $R_4$ was placed at the output of the first amplifier stage. Consequently, the gain control does not affect the offset, nor does the offset control affect the gain. Suppression of the 40-kHz carrier is accomplished by the two first-order lowpass filters 112 and 114. The output of filter 114 is a simple d.c. signal output without a carrier.

DERIVATIVE APPLICATIONS OF THE INVENTION

The present invention is amenable to numerous significant uses and embodiments.

Figure 5:
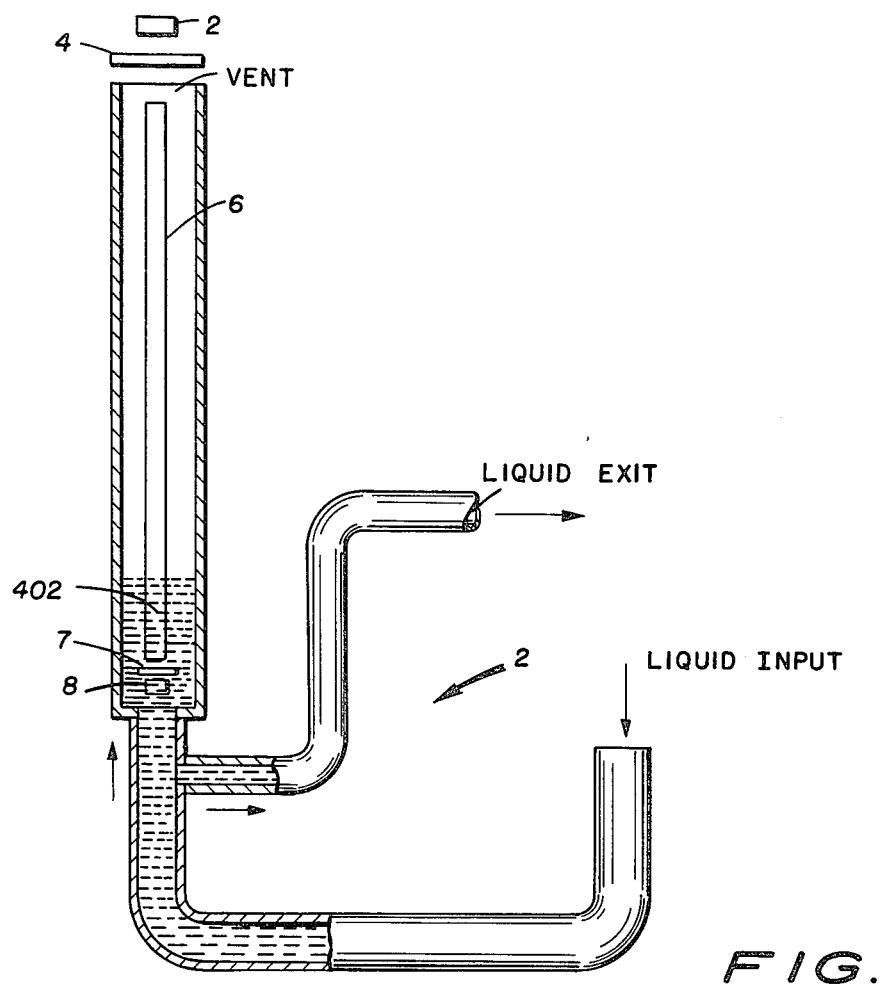
FIGS. 5 and 6 are diagrams illustrating the use of the invention in measuring pressure differentials and fluid velocity for a liquid and gas, respectively.
Figure 6:
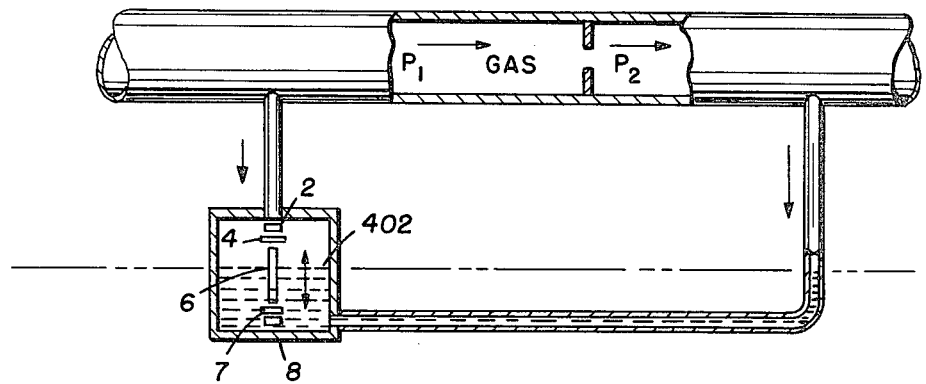

In FIGS. 5 and 6, the measurement of liquid or gas velocity or pressure differential ($P_2-P_1$) is made by use of the present invention. Specifically, as liquid or gas velocity or pressure differential varies, the level of a fluid in a reservoir 402 varies accordingly. With the capacitive fluid level embodiment immersed in the fluid, the changes in fluid level can be measured to provide an indication of pressure differential or liquid flow or gas flow velocity. The energy source 2, modulator 4, conveying element 6, demodulator 7, and detector 8 discussed with reference to FIG. 1 are similarly shown in FIGS. 5 and 6.

Finally the invention is particularly adaptive for use in detecting impurities in a fluid medium, like ocean or river water. Impurities or pollutants in water affect light refraction, or absorption, in a characteristic manner. By determining the signatures of known pollutants or impurities and programming them into a processor 309, the presence of a particular impurity based on signal variations in an capacitive system can be detected.

It should be noted that the energy source 2, modulator 4, and signal processing element 309 (of FIG. 1) may be common to a plurality of elements placed in an array or matrix.

Further, the output from the present invention, in addition to being processed, may be telemetered to a remote location by conventional means (before or after processing).

Various modifications, adaptations and alterations to the present invention are of course possible in light of the above teachings. It should therefore be understood at this time that within the scope of the appended claims, the invention may be practiced otherwise than was specifically described hereinabove.

What is claimed is:

1. Apparatus for measuring the level of a fluid comprising:
    capacitive means $C_x$ comprised of two stationary electrically conductive elements partially immersed in the fluid and a dielectric which surrounds and insulates the first element, the first element having sealing means for electrically isolating the first element from the fluid and the second element being electrically grounded to the fluid, means for providing an electrical signal to the capacitive means $C_x$, and means, connected across the capacitive means $C_x$, for providing a voltage output signal across the capacitive means $C_x$ which varies essentially linearly in response to fluid level variations.

2. Apparatus, as in claim 1, wherein the output signal providing means comprises:

a series of two diodes $D_1$ and $D_2$, each biased in the same direction, and a resistance $R_2$, wherein the two-diode series and the resistance $R_2$ are each in parallel with the capacitive means $C_x$.

3. Apparatus, as in claim 2, wherein the signal providing means comprises:

means for generating a square wave of fixed amplitude and for switching a carrier signal in accordance with the square wave, and means for adjusting the duty cycle of the square wave between "on" time $T_1$ and "off" time $T_2$, and wherein the capacitive means $C_x$, the resistances $R_1$ and $R_2$, and the duty cycle have values defined by the relationships:

$$R_1 C_x << R_2 C_x$$

$$R_2 C_x << T_2$$

$$R_1 C_x << T_1$$

$$T_1 << T_2.$$

4. Apparatus, as in claim 3, further comprising:

filter means, electrically connected across the capacitive means $C_x$, for providing an average value signal $v_b(t)$ which is linearly proportional to the value of the capacitive means $C_x$ as well as the fluid level.

5. Apparatus, as in claim 4, wherein the filter means further comprises low-pass filtering means for suppressing the carrier.

6. Apparatus, as in claim 2, further comprising:

a capacitance $C_p$ and a resistance $R_1$ in series, the series comprising capacitance $C_p$ and resistance $R_1$ being electrically connected between the signal providing means and the connection between the diodes $D_1$ and $D_2$.

7. Apparatus, as in claim 1, wherein the first element and the dielectric comprise a length of anodized Tantalum.

8. Apparatus, as in claim 7, wherein the fluid level varies in wave motion and the thickness of the length of anodized Tantalum is less than one wavelength of the fluid level wave motion.

9. Apparatus, as in claim 1, further comprising:

means for digitizing, recording, and processing the linear response output signals to determine wave characteristics, such as wave motion, wave shape, and wave amplitude of the fluid.

10. Apparatus, as in claim 1, further comprising:

means for telemetering the linear response output signals to a remote location.

11. Apparatus, as in claim 1, further comprising:

a plurality of capacitive means $C_x$ connected to a single electrical signal providing means, each capacitive means having an associated linear response output signal, and means for comparing the plurality of linear response output signals and determining dynamic wave characteristics, such as wave amplitude, wave shape, and wave motion of the fluid over time.

12. Apparatus, as in claim 1, wherein the output signal providing means comprises means for limiting phase shift between fluid level variations and the output signal response from the output signal providing means.

13. Apparatus, as in claim 12, wherein the phase shift limiting means comprises only nonreactive circuit elements.

14. Apparatus, as in claim 13, wherein the nonreactive circuit elements comprise:

a series of two diodes $D_1$ and $D_2$, each biased in the same direction, and a resistance $R_2$, wherein the two-diode series and the resistance $R_2$ are each in parallel with the capacitive means $C_x$.

* * * * *